Dec. 24, 1968   C. V. ANDERSON   3,417,504
TRAP
Filed June 14, 1967   2 Sheets-Sheet 1

INVENTOR.
Clarence V. Anderson
BY
George B. White
Attorney

Dec. 24, 1968  C. V. ANDERSON  3,417,504
TRAP
Filed June 14, 1967  2 Sheets-Sheet 2

INVENTOR.
Clarence V. Anderson
BY
Attorney

United States Patent Office 3,417,504
Patented Dec. 24, 1968

3,417,504
TRAP
Clarence V. Anderson, P.O. Box 488,
Forestville, Calif. 95436
Filed June 14, 1967, Ser. No. 646,051
10 Claims. (Cl. 43—85)

ABSTRACT OF THE DISCLOSURE

A ring-like circular housing has an outwardly extending base flange and forms an annular channel into which is compressed a tubular gripper made of longitudinal spirally cross-woven spring strands biased so as normally to expand the tubular gripper longitudinally and contract it radially in proportion to its elongation for gripping the paw or nose of an animal caught therein. The inner ends of the strands are combined and are adapted to be tied or anchored in such a way that the harder the animal pulls the gripper the more it elongates the gripper and the firmer it grips. The compressed tubular gripper is held in position by diametrically opposite pivoted flaps which extend over the channel and over the top or outer end of the tubular gripper, and the flaps are held in obstructing positions by fingers extended through the inner wall of the channel. The fingers are held in a hollow brace diametrically across the inner surface of the inner wall of the channel, and are connected to a disc journalled vertically within the hollow brace near the center thereof and axially to the housing. A tripping arm extends from the disc eccentrically but in parallel with the axis of the housing and through the top wall of the hollow brace and has on it a suitable tripper pan.

Brief description of the invention

In order to eliminate suffering inflicted on animals by steel jawed traps now in common use, this invention provides a tubular gripper which contracts radially when expanded in proportion to its elongation; the gripper is resiliently compressible; releasable means being provided to hold the gripper compressed, and tripping means being provided to be actuated by the animal stepping on or touching the pan or reaching for a bait, for tripping the trigger means, thereby to release the compressed tubular gripper to expand about the actuating part of the animal; the spring gripper contracts about the part of the animal so that the harder the animal struggles and pulls the firmer it is gripped; the trap can be adapted for large or small animals and may be anchored in a variety of positions suitable to the habits of the animals to be trapped; this device is readily adaptable to be used either as a trap or as a snare, and it is intended that the term "trap" as used herein used include both.

Detailed description

Figure 1:
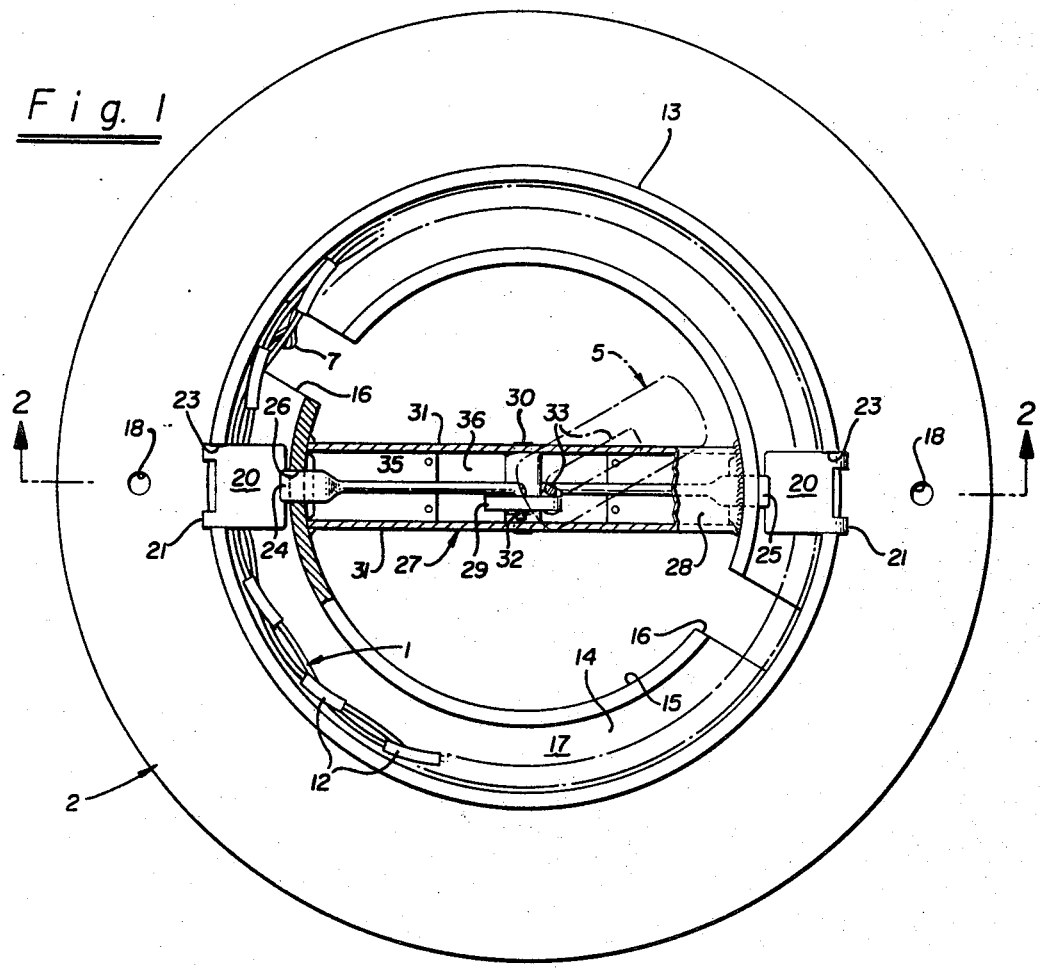
FIG. 1 is a top plan view of the trap, partly in section.

A resiliently compressible tubular gripper 1 of the type which radially contracts in proportion to its elongation, is compressed into a housing 2, and is held so compressed by a trigger device 3, which latter is released by a tripping device 4 including a pan 5.

The compressible tubular gripper 1 is of the general principle of cross-woven wire strands shown in U.S. Patent No. 2,268,598, issued on Jan. 6, 1942 to D. L. Kellems, wherein the elongation of the tubular wire gripper results in radial contraction for frictional engagement of an object within the gripper. In the trap the tubular gripper 1 is made of spirally cross-woven spring wire strands 6 biased normally to expand longitudinally, and to contract radially in proportion to the longitudinal expansion. The strands 6 are combined at the inner end of the gripper 1, relatively to the housing 2, into a pair of terminal or anchoring strands 7 and 8, whereby the inner end of the gripper 1 can be held fixed. For this purpose the terminal strand 7 has a loop 9 on its end and the other terminal strand 8 is extended and has loop 10 thereon to be inserted through the loop 9 and anchored to a tree or a stationary object on the ground. The loop 10 is held on a swivel joint 11. The return bends of the spring wire strands 6 at the top or outer end of the gripper 1 are held against undue flattening or lateral spreading by suitably rigid bent clips 12 to assure predetermined contraction when the gripper springs into expanded attitude.

The housing 2 has a ring-like body 13 with an annular channel 14 therein to accommodate the gripper 1. The inside wall 15 of the body 13 has opposite cut-away portions or slots 16 through which extend the terminal strands 7 and 8 respectively, for holding the inner end of gripper 1 within the housing 2. A base flange 17 forms the bottom of the channel 14 and extends outwardly all around the body 13. In the herein illustrative embodiment the housing 2 is made in two concentric rings or bands spaced from one another to form the channel 14. Base flanges of said rings are superimposed and secured together integrally, for instance by welding. The base flange 17 has suitable means, such as holes 18 therethrough to accommodate a cord or wire 19 for tying the housing to a tree or the like.

The trigger device 3 includes diametrically opposite restraining flaps 20. An end of each flap 20 is forked and bent into hinges 21 through slots 22 in the outer wall of the body 13. The flaps 20 are recessed in cut-away portions 23 in the top of the outer wall of the body 13 so as to be below the level of the top of the housing 2.

The flaps 20 are held in obstructing position by fingers 24 and 25 which are guided in slots 26 through the inner wall 15 of the body 13. A hollow brace 27 extends diametrically across the space enclosed by the inner wall 15 and has its ends welded to the inner surface of the inner wall 15. The hollow brace 27 is preferably of rectangular cross-section with a flat top 28 exposed at the top and spaced below the level of the top edge of the inner wall 15. A crank element, in the form of a disc 29 is journalled within the middle portion of said hollow brace 27, positioned in a perpendicular plane parallel with the axis of the ring-like body 13. The disc 29 is journalled on a cross pin or shaft 30 held in the perpendicular sides 31 of the brace 27. The finger 24 is extended along and below the top wall 28 of the brace 27 and its bent end 32 is journalled on a portion of the disc nearest to the top wall 28 above the center of the disc 29, viewing FIG. 2. The other finger 25 is bent away from the top wall 28 and is extended to and is journalled on the opposite or lower portion below the center of the disc 29 so that as the disc 29 is turned about is axis in clockwise direction, viewing FIG. 2, the fingers 24 and 25 are withdrawn from above the flaps 20, allowing the spring gripper 1 to push the flaps 20 out of the way thereby to expand.

The tripping device 4 includes the elongated pan 5 on an arm 33 slidable through an elongated slot 34 in the top wall 28 of the brace 27 and fastened at its inner end to the side of the disc 29 eccentrically offset in the direction of finger 25. The pan 5 is spaced above the top wall 28 just sufficiently to permit sufficient movement toward the flat top wall 28 to turn the disc 29 far enough to withdraw the fingers 24 and 25 out of the way of the flaps 20. The pan 5 is preferably in the space between the flat top wall 28 and the top level of the ring-like housing 2 so as to form a compact unit thereby to cause the animal to touch the pan 5 well within the area surrounded by the expanded spring gripper 1.

Figure 2:
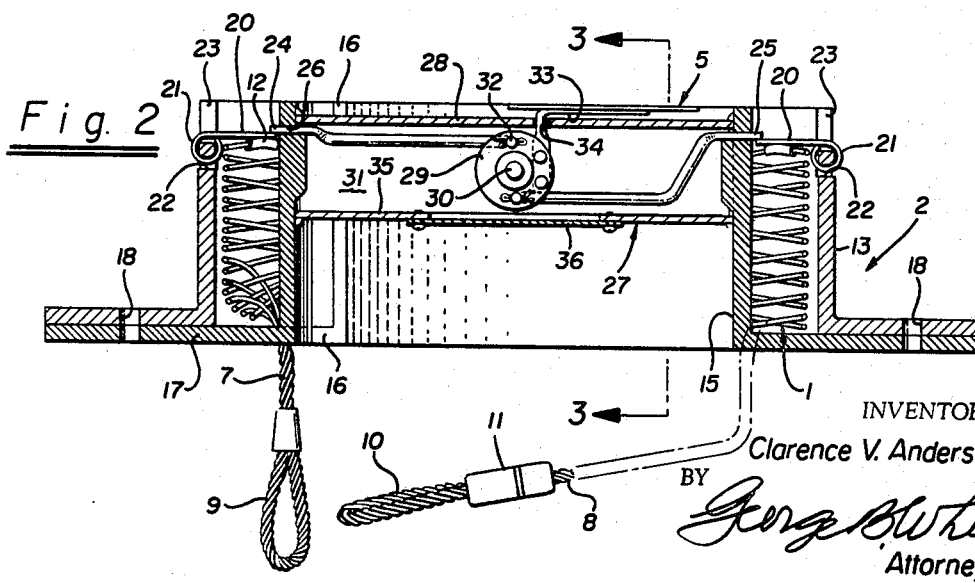
FIG. 2 is a cross-sectional view of the trap, the section being taken on lines 2—2 of FIG. 1.
Figure 3:
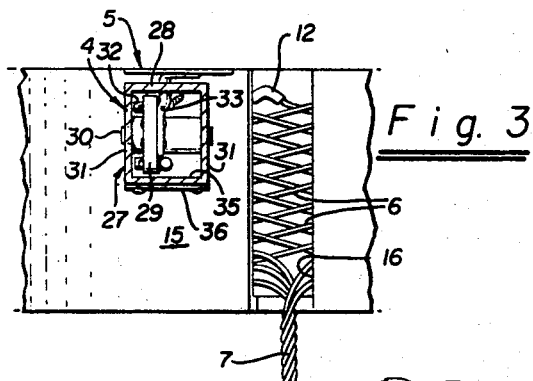
FIG. 3 is a fragmental sectional view of the trap, the section being taken on lines 3—3 of FIG. 2.

In order to use the same device as a snare where the bait is pulled by the animal, either the arm 33 is fastened offset to the opposite side from the axis of the disc 29 to that heretofore described, or the fingers 24 and 25 are interchanged to opposite sides from the positions shown in FIG. 2. To permit access to the disc 29 and to the fingers 24 and 25 the bottom 35 of the brace 27 is cut away and is covered by a removable plate 36.

Figure 5:
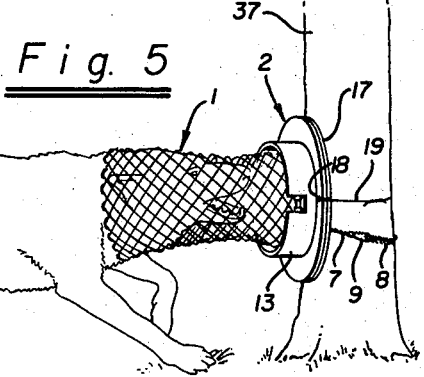
FIG. 5 is a perspective view illustrating the use of the trap anchored on a tree.
Figure 4:
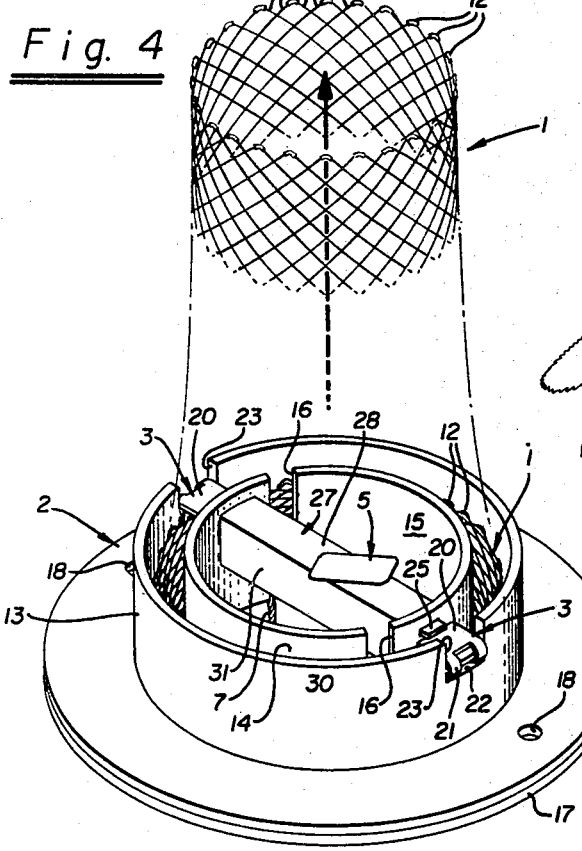
FIG. 4 is a perspective view of the trap illustrating the expanding of the released gripper.
Figure 6:
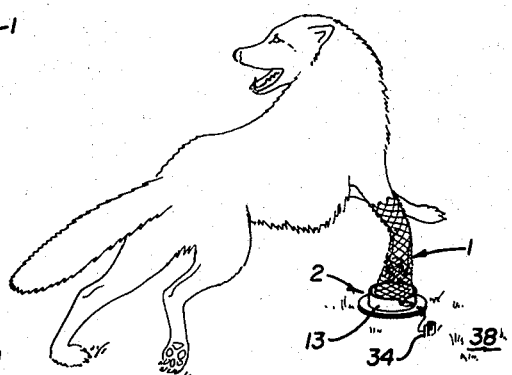
FIG. 6 is a perspective view illustrating the trap anchored on the ground.

In operation the trap may be hung on a tree 37 as shown in FIG. 5, by wrapping the cord or wire 19 around the tree trunk, or to another stationary object, and anchoring the swiveling loop 10 of terminal strand 8 either on the tree 37 or to a stake 34 on the ground 38, in the position shown in FIG. 6, or anchoring or tying in any position according to the habit of the animal to be trapped. As the animal touches the pan 5 and moves the arm 33, it turns the disc 29 so as to pull the fingers 24 and 25 out of the way of the flaps 20, whereupon the spring gripper 1 pushes the flaps 20 out of the way and springs into expanded position over the part of the animal touching the pan 5, and contracts about said part.

The wire or cord 19 is of limited strength so that as the trapped animal struggles and pulls it tears the wire or cord 19, whereupon the housing 2 hangs freely on the gripper 1. The swivel joint 11 of the anchoring loop 10 is important to withstand the efforts of the animal in violently shaking and twisting and pulling the trap. The pulling force exerted by the animal tightens the freely anchored gripper 1.

Thus the trap is positive in operation, it does not inflict painful injury on the trapped animal and eliminates the tendency of animals to chew off a trapped paw or leg. The device is easily set, and cannot injure the person setting it. The device is light weight, compact, durable, flexible in application, simple in structure and operation, therefore eminently adapted for its purposes.

I claim:
1. In a trap of the character described,
 (a) a tubular gripper made of longitudinally and spirally cross-woven spring strands biased so as normally to expand the gripper longitudinally and contract it radially in proportion to its elongation for gripping a part of an animal caught therein,
 (b) a housing having a cavity, said tubular gripper being resiliently compressible into said cavity of said housing.
 (c) trigger means on the housing normally to engage and hold the tubular gripper compressed in said housing,
 (d) anchoring means on the inner end of the gripper whereby said gripper is anchored on a stationary object, and
 (e) tripping means for tripping said trigger means thereby to release the compressed tubular gripper for expansion from said housing to grip the part of the animal engaging said tripping means, said tripping means being accessible only through an area surrounded by said tubular gripper when expanded.
2. The trap defined in claim 1, wherein said trigger means includes,
 (f) an obstruction member pivoted on said housing and engaging the outer end of the compressed tube in the housing,
 (g) a finger movable over the free end of said obstruction member to hold it in obstructing position,
 (h) said tripping means including a device for pulling said finger away from said obstruction member thereby freeing the compressed gripper to push said pivoted obstruction member out of the way and to expand from said housing whereby to contract about the part of the animal at said tripping means,
 (i) and a pan located about in registry with the middle portion of said housing for actuating said pulling device whenever said pan is moved.
3. The trap defined in claim 1, and
 (f) said anchoring means comprising terminal strands for holding the inner ends of the strands of the tubular gripper within the housing, whereby said inner end of said tubular gripper is secured to a stationary object.
4. The trap defined in claim 1, and
 (f) said anchoring means including terminal strands on the end of the tubular gripper within said channel,
 (g) said ring-like member having apertures, and said terminal strands extending through said apertures,
 (h) a first loop on the end of one of said terminal strands,
 (i) and a swiveling loop on the end of the other terminal strand insertable through said first loop to be anchored to a stationary object.
5. The trap defined in claim 1, and
 (f) said anchoring means comprising terminal strands extended from the inner end of the tubular gripper within the housing, and
 (g) securing elements on said terminal strands to tie said terminal strands to a stationary object outside said housing.
6. The trap defined in claim 1, and
 (f) said housing being a ring-like member having an annular channel adapted to receive said compressed tubular gripper,
 (g) a diametrical hollow brace element fixed across the inner periphery of the ring-like member,
 (h) said trigger means including fingers projecting from opposite ends of said hollow brace element and into obstructing position over the top of the compressed tubular gripper,
 (i) and a crank element in said hollow brace element connected to said tripping means to pull said projecting fingers out of said obstructing positions whenever said tripping means are actuated.
7. The trap defined in claim 6, and
 (j) said crank element being confined within said hollow brace element,
 (k) said tripping means including an arm extended from said crank element through said hollow brace element, and supporting a pan in predetermined position.
8. The trap defined in claim 1, and
 (f) said housing including a ring-like body,
 (g) an annular outer wall and an annular inner wall spaced from one another defining said cavity so as to form an annular channel open at its top,
 (h) a base flange on the lower edges of said outer and inner walls forming a bottom of the channel and extending outwardly from said outer wall,
 (i) said trigger means being below the level of the top of said channel,
 (j) said tripping means being below the top of said channel and being within the area determined by said inner wall.
9. The trap defined in claim 8, and
 (k) said anchoring means comprising a pair of terminal anchoring strands formed from the inner ends of said cross-woven strands,
 (l) said housing having apertures near said base flange, said anchoring terminal strands extending through said apertures and being adapted to be tied to a stationary object.

10. The trap defined in claim 8, and
(m) said trigger means including pivoted flaps on one of said channel walls extending into obstructing position over the top of the compressed gripper in said channel,
(n) a hollow brace fixed across the inner surface of said inner wall in registry with said flaps,
(o) a crank element journalled in about the middle of said hollow brace in a perpendicular position,
(p) fingers extended in opposite directions from said crank element and over said flaps thereby to hold said flaps in obstructing position,
(q) said tripping means including an arm extended from said crank element through said hollow brace,
(r) a pan on the arm within the area enclosed by said inner wall for turning said crank element when moved by an animal thereby to pull said fingers out of the way of said flaps to release said gripper.

References Cited

UNITED STATES PATENTS

| | | | |
|---|---|---|---|
| 1,010,486 | 12/1911 | Firnhaber | 43—85 |
| 2,200,617 | 5/1940 | Clover | 43—87 |
| 2,247,066 | 6/1941 | Popp | 43—87 |
| 2,318,164 | 5/1943 | Kellems | 294—86 |
| 2,578,856 | 12/1951 | Story | 43—85 |

WARNER H. CAMP, *Primary Examiner.*